United States Patent
Uchimura et al.

(10) Patent No.: US 12,148,023 B2
(45) Date of Patent: Nov. 19, 2024

(54) PROCESSING APPARATUS, PROCESSING METHOD, AND NON-TRANSITORY STORAGE MEDIUM

(71) Applicant: NEC Corporation, Tokyo (JP)

(72) Inventors: Jun Uchimura, Tokyo (JP); Yuji Tahara, Tokyo (JP); Rina Tomita, Tokyo (JP); Yasuyo Kazo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 252 days.

(21) Appl. No.: 17/775,610

(22) PCT Filed: Oct. 29, 2020

(86) PCT No.: PCT/JP2020/040580
§ 371 (c)(1),
(2) Date: May 10, 2022

(87) PCT Pub. No.: WO2021/095539
PCT Pub. Date: May 20, 2021

(65) Prior Publication Data
US 2022/0398648 A1  Dec. 15, 2022

(30) Foreign Application Priority Data
Nov. 15, 2019 (JP) .................. 2019-206673

(51) Int. Cl.
*G06Q 30/06* (2023.01)
*G06Q 10/0639* (2023.01)
(Continued)

(52) U.S. Cl.
CPC ... *G06Q 30/0639* (2013.01); *G06Q 10/06393* (2013.01); *G06T 7/70* (2017.01)

(58) Field of Classification Search
CPC .......... G06Q 30/0601; G06Q 30/0639; G06Q 10/06393; G06T 7/70; G06T 17/70
(Continued)

(56) References Cited

U.S. PATENT DOCUMENTS

2010/0171826 A1* 7/2010 Hamilton ............... H04N 7/188
348/135
2013/0325533 A1  12/2013 Shin
(Continued)

FOREIGN PATENT DOCUMENTS

CA       3120688 A1 * 12/2019  ....... G06Q 10/06315
JP       2010-033115 A    2/2010
(Continued)

OTHER PUBLICATIONS

Irion, J; Lu, J-c; Al-khayyal, F A; Tsao, Y-c.; "A hierarchical decomposition approach to retail shelf space management and assortment decisions"; The Journal of the Operational Research Society62.10: 1861-1870. Taylor & Francis Ltd. (Oct. 2011); retrieved from Dialog on Mar. 11, 2024 (Year: 2011).*

(Continued)

*Primary Examiner* — Yogesh C Garg
(74) *Attorney, Agent, or Firm* — Sughrue Mion, PLLC

(57) ABSTRACT

The present invention provides a processing apparatus (10) including: an acquisition unit (11) that acquires an image including a product display shelf; a display location determination unit (12) that determines, based on the image, a display location of each of products; a computation unit (13) that computes, based on the determined display location of each of the products, a sales-related score relating to sales; and an output unit (14) that outputs the computed sales-related score.

8 Claims, 9 Drawing Sheets

(51) Int. Cl.
    *G06Q 30/0601* (2023.01)
    *G06T 7/70* (2017.01)
(58) Field of Classification Search
    USPC .......................................................... 705/26.9
    See application file for complete search history.

(56) References Cited

U.S. PATENT DOCUMENTS

2020/0034781 A1* 1/2020 Sewak ................. G06Q 10/067
2020/0394599 A1 12/2020 Akatsuka

FOREIGN PATENT DOCUMENTS

| | | |
|---|---|---|
| JP | 2010-152504 A | 7/2010 |
| JP | 2013-250647 A | 12/2013 |
| JP | 2014-075090 A | 4/2014 |
| JP | 2016-009426 A | 1/2016 |
| WO | 2019/107157 A1 | 6/2019 |

OTHER PUBLICATIONS

International Search Report for PCT Application No. PCT/JP2020/040580, mailed on Jan. 12, 2021.

\* cited by examiner

FIG. 5

SCORE INFORMATION (PRODUCT A)

|  | COLUMN A | COLUMN B | COLUMN C | COLUMN D |
|---|---|---|---|---|
| STEP 4 | 2 | 3 | 3 | 2 |
| STEP 3 | 1 | 5 | 5 | 1 |
| STEP 2 | 1 | 4 | 4 | 1 |
| STEP 1 | 1 | 2 | 2 | 1 |

FIG. 6

SCORE INFORMATION (PRODUCT B)

| | COLUMN A | COLUMN B | COLUMN C | COLUMN D |
|---|---|---|---|---|
| STEP 4 | 2 | 4 | 4 | 2 |
| STEP 3 | 2 | 5 | 5 | 2 |
| STEP 2 | 1 | 6 | 6 | 1 |
| STEP 1 | 1 | 1 | 1 | 1 |

FIG. 8

SCORE INFORMATION
(PRODUCT A - FOR STORE IN STUDENT QUARTER)

|  | COLUMN A | COLUMN B | COLUMN C | COLUMN D |
|---|---|---|---|---|
| STEP 4 | 4 | 5 | 5 | 4 |
| STEP 3 | 4 | 4 | 4 | 4 |
| STEP 2 | 3 | 3 | 3 | 3 |
| STEP 1 | 1 | 2 | 2 | 1 |

FIG. 9

SCORE INFORMATION
(PRODUCT A - FOR STORE IN BUSINESS DISTRICT)

|  | COLUMN A | COLUMN B | COLUMN C | COLUMN D |
|---|---|---|---|---|
| STEP 4 | 1 | 2 | 2 | 1 |
| STEP 3 | 3 | 4 | 4 | 3 |
| STEP 2 | 2 | 3 | 3 | 2 |
| STEP 1 | 2 | 3 | 3 | 2 |

PROCESSING APPARATUS, PROCESSING METHOD, AND NON-TRANSITORY STORAGE MEDIUM

This application is a National Stage Entry of PCT/JP2020/040580 filed on Oct. 29, 2020, which claims priority from Japanese Patent Application 2019-206673 filed on Nov. 15, 2019, the contents of all of which are incorporated herein by reference, in their entirety.

TECHNICAL FIELD

The present invention relates to a processing apparatus, a processing method, and a program.

BACKGROUND ART

Patent Document 1 discloses that benefit information indicating a profit acquired when each product is displayed in each shelf location is generated, based on a past sales result. Further, Patent Document 1 discloses that, based on a shelf location of a product disposed on a shelf, benefit information is extracted with respect to each of products and an evaluation value acquired by adding these pieces of benefit information is computed.

Patent Document 2 discloses that a product displayed on a product shelf is recognized based on an image analysis.

CITATION LIST

Patent Document

[Patent Document 1] Japanese Patent Application Publication No. 2010-152504
[Patent Document 2] International Publication No. WO2019/107157

DISCLOSURE OF THE INVENTION

Technical Problem

It is known that a matter of "on what portion of a display shelf a product is displayed" affects sales of a product. According to the technique described in Patent Document 1, it is possible to evaluate whether, based on a display location of each product, a state where a display state of a product can achieve a sales increase is achieved. However, Patent Document 1 does not disclose a means for determining a display location of each product. When a worker determines a display location with respect to each product and inputs the determined display location to an apparatus, a load on the worker increases. Patent Document 2 does not describe or suggest that it is possible to evaluate whether, based on a display location of each product, a state where a display state of a product can achieve a sales increase is achieved.

An issue of the present invention is to provide a technique for evaluating, based on a display location of each product, a display state of a product while a worker load is reduced.

Solution to Problem

According to the present invention, provided is a processing apparatus including:
an acquisition means for acquiring an image including a product display shelf;
a display location determination means for determining, based on the image, a display location of each of products;
a computation means for computing, based on the determined display location of each of the products, a sales-related score relating to sales; and
an output means for outputting the computed sales-related score.

Further, according to the present invention, provided is a processing method including:
by a computer,
acquiring an image including a product display shelf;
determining, based on the image, a display location of each of products;
computing, based on the determined display location of each of the products, a sales-related score relating to sales; and
outputting the computed sales-related score.

Further, according to the present invention, provided is a program for causing a computer to function as:
an acquisition means for acquiring an image including a product display shelf;
a display location determination means for determining, based on the image, a display location of each of products;
a computation means for computing, based on the determined display location of each of the products, a sales-related score relating to sales; and
an output means for outputting the computed sales-related score.

Advantageous Effects of Invention

According to the present invention, a technique for evaluating, based on a display location of each product, a display state of a product is achieved while a worker load is reduced.

BRIEF DESCRIPTION OF THE DRAWINGS

FIG. 5 is a diagram schematically illustrating one example of information to be processed by the processing apparatus according to the present example embodiment.

FIG. 6 is a diagram schematically illustrating one example of information to be processed by the processing apparatus according to the present example embodiment.

FIG. 8 is a diagram schematically illustrating one example of information to be processed by the processing apparatus according to the present example embodiment.

FIG. 9 is a diagram schematically illustrating one example of information to be processed by the processing apparatus according to the present example embodiment.

DESCRIPTION OF EMBODIMENTS

First Example Embodiment

First, an outline of a processing apparatus according to the present example embodiment is described. The processing apparatus acquires an image including a product display shelf, determines, based on the acquired image, a display location of each of products, and computes, based on the determined display location of each of the products, a sales-related score (an evaluation value of a product layout) relating to sales.

According to such a processing apparatus, it is possible to evaluate whether, based on a display location of each product, a state where a display state of a product can achieve a sales increase is achieved. Further, a display location of each product can be determined by analyzing an image, and therefore a load on a worker can be reduced, compared with a case where a worker determines a display location of each product and inputs the determined display location to an apparatus.

Next, one example of a hardware configuration of the processing apparatus is described. A function unit included in the processing apparatus according to the present example embodiment is achieved based on any combination of hardware and software mainly including a central processing unit (CPU) of any computer, a memory, a program loaded onto a memory, a storage unit such as a hard disk and the like storing the program (the storage unit being capable of storing, in addition to a program previously stored from a stage at which an apparatus is shipped, a program downloaded from a storage medium such as a compact disc (CD) and the like, a server on the Internet, and the like), and a network connection interface. Then, it should be understood by those of ordinary skill in the art that, in an achievement method and an apparatus for the above, there are various modified examples.

Figure 1:
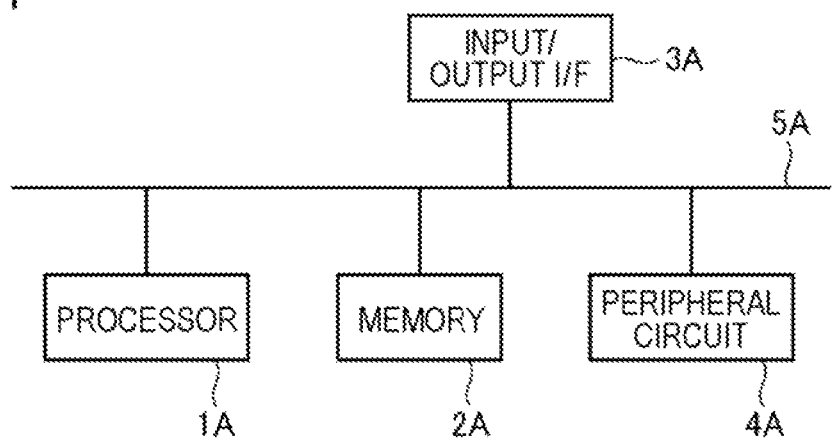
FIG. 1 is a diagram illustrating one example of a hardware configuration of a processing apparatus according to the present example embodiment.

FIG. 1 is a block diagram illustrating a hardware configuration of the processing apparatus according to the present example embodiment. As illustrated in FIG. 1, the processing apparatus includes a processor 1A, a memory 2A, an input/output interface 3A, a peripheral circuit 4A, and a bus 5A. The peripheral circuit 4A includes various modules. Note that, the peripheral circuit 4A is not necessarily included. Note that, the processing apparatus may be configured by a single apparatus physically and/or logically integrated, or may be configured by a plurality of apparatuses physically and/or logically separated. When a configuration is made by a plurality of apparatuses physically and/or logically separated, each of the plurality of apparatuses can include the above-described hardware configuration.

The bus 5A is a data transmission path through which the processor 1A, the memory 2A, the peripheral circuit 4A, and the input/output interface 3A mutually transmit/receive data. The processor 1A is an arithmetic processing apparatus, for example, such as a CPU and a graphics processing unit (GPU). The memory 2A is a memory, for example, such as a random access memory (RAM) and a read only memory (ROM). The input/output interface 3A includes an interface for acquiring information from an input apparatus, an output apparatus, an external server, an external sensor, a camera, and the like, an interface for outputting information to an output apparatus, an external apparatus, an external server, and the like, and the like. The input apparatus is, for example, a keyboard, a mouse, a microphone, a touch panel, a physical button, a camera, or the like. The output apparatus is, for example, a display, a speaker, a printer, a mailer, or the like. The processor 1A can issue an instruction to each module and perform an arithmetic operation, based on an arithmetic operation result of the module.

Figure 2:
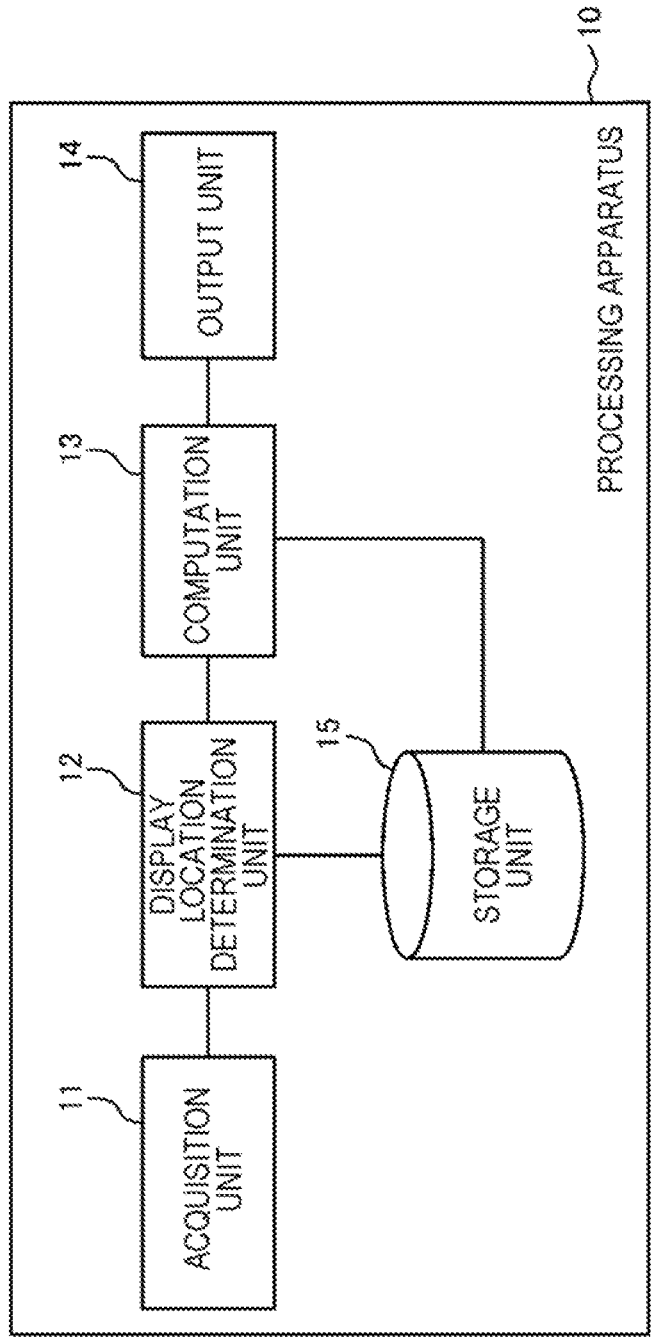
FIG. 2 is one example of a function block diagram of the processing apparatus according to the present example embodiment.

Next, a function configuration of the processing apparatus is described. FIG. 2 illustrates one example of a function block diagram of a processing apparatus 10. As illustrated, the processing apparatus 10 includes an acquisition unit 11, a display location determination unit 12, a computation unit 13, an output unit 14, and a storage unit 15.

Figure 3:
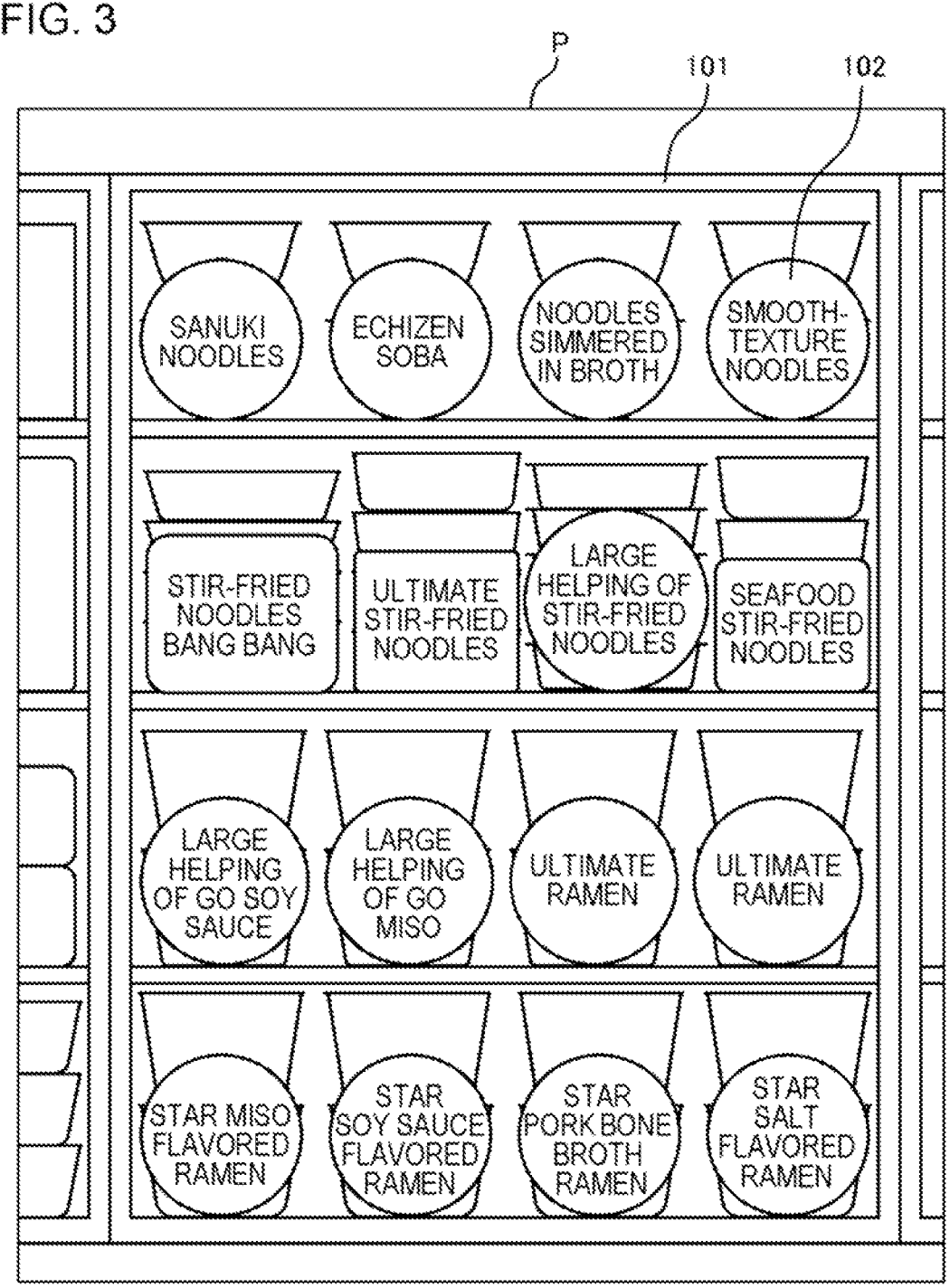
FIG. 3 is a diagram schematically illustrating one example of information to be processed by the processing apparatus according to the present example embodiment.

The acquisition unit 11 acquires an image including a product display shelf. The acquisition unit 11 may acquire, in addition to an image, attribute information (information discriminating an image-captured store, an image-capture time and date, and the like) of the image. FIG. 3 schematically illustrates one example of an image P acquired by the acquisition unit 11. In the illustrated example, a scene where a plurality of products 102 are displayed on a product display shelf 101.

For example, a plurality of cameras may be installed in a store in a location and a direction where an image of each of a plurality of product display shelves is captured. Then, a camera may capture an image of a product display shelf at a predetermined timing, and transmit the captured image to the processing apparatus 10. A predetermined timing at which a camera captures an image may be a previously-determined timing. It is conceivable that the previously-determined timing is, for example, "a predetermined time once every day", "a predetermined time of a day of A every month", or the like. The predetermined time may be a time immediately after a scheduled time at which a new product is arrived at a store and display onto a shelf is finished. Further, a predetermined timing at which a camera captures an image may be a timing at which a worker (a store clerk or the like) inputs an image-capture instruction. In this case, a worker may input an image-capture instruction to any apparatus (the processing apparatus 10, a smartphone, a personal computer, a tablet terminal, or the like). Then, the any apparatus may transmit the input image-capture instruction to a camera.

In addition, a worker may manually capture, while moving in a store by carrying a camera or a mobile terminal (e.g., a tablet terminal, a smartphone, a mobile phone, or the like) including a camera function, an image of each of a plurality of product display shelves. In addition, a robot including a camera function and a moving means may capture, while moving in a store, an image of each of a plurality of product display shelves. Then, a captured shelf image may be input to the processing apparatus 10 by using any means. Note that, a camera, a mobile terminal including a camera function, or a robot may include a communication function of communicating with the processing apparatus 10 via a communication network. Then, the camera, the mobile terminal including a camera function, or the robot may transmit a shelf image to the processing apparatus 10 via a communication network. The processing apparatus 10 can function as a server (e.g., a cloud server).

Note that, in the present description, "acquisition" may include a matter that "a local apparatus fetches data stored in another apparatus or a storage medium (active acquisition)", based on user input or based on an instruction from a program, for example, a matter that reception is executed by making a request or an inquiry to another apparatus, a matter that reading is executed by accessing another apparatus or a storage medium, or the like. Further, "acquisition" may include a matter that "data output from another apparatus are input to a local apparatus (passive acquisition)", based on user input or based on an instruction from a program, for example, a matter that data distributed (or transmitted, reported on a push basis, or the like) are received, or the like. Furthermore, "acquisition" includes a matter that selective acquisition is executed from among received pieces of data or information, and a matter that "new data are generated by data editing (projective transformation of an image, processing for plane development of an image captured by a fish-eye camera, conversion to text, data rearrangement, partial data extraction, file-format modification, and like) and the new data are acquired".

Referring back to FIG. 2, the display location determination unit 12 determines, based on an image acquired by the acquisition unit 11, a display location of each of products.

Figure 4:
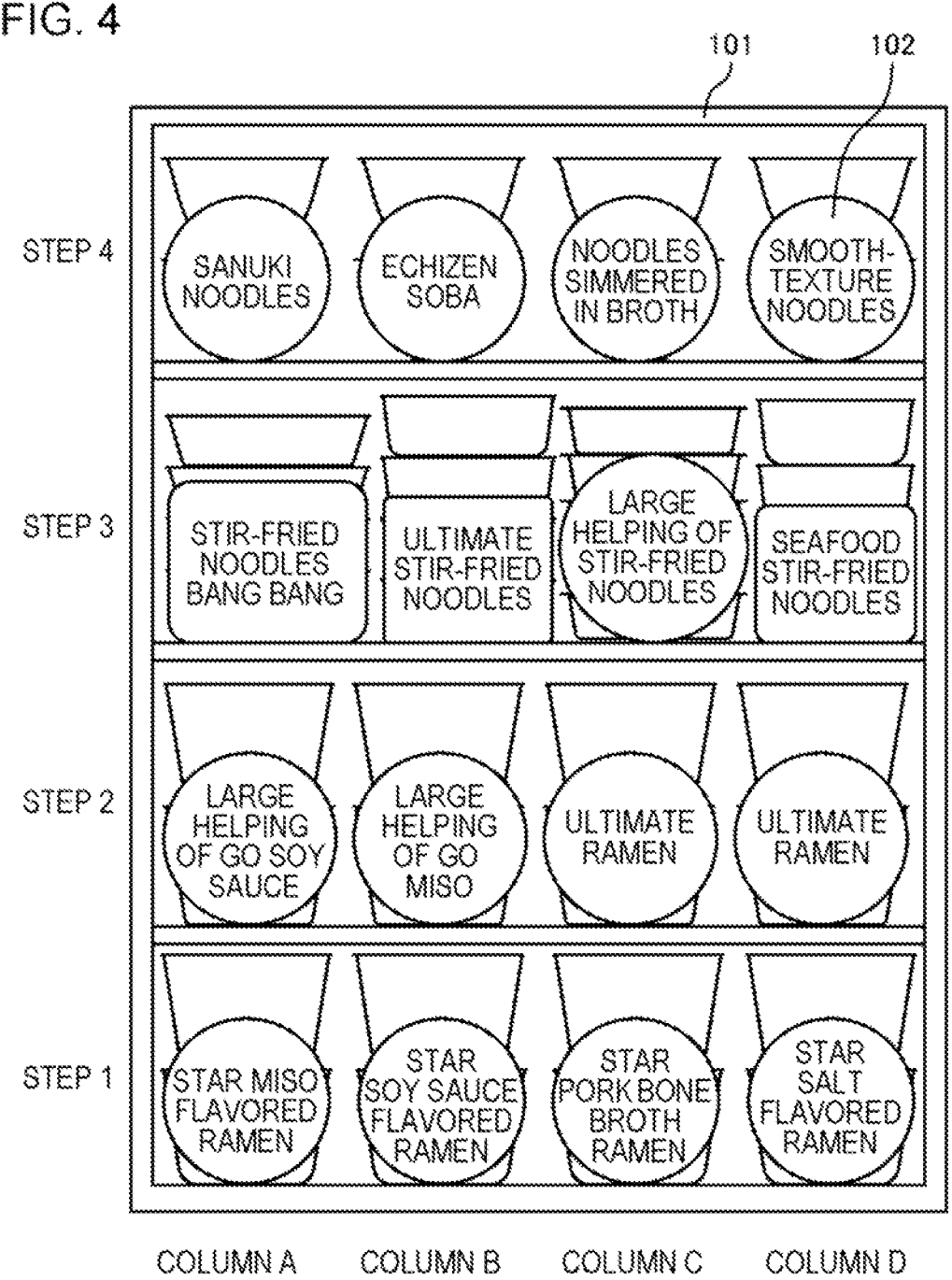
FIG. 4 is a diagram for illustrating processing of the processing apparatus according to the present example embodiment.

First, according to the present example embodiment, as illustrated in FIG. 4, a step and a column of the product display shelf 101 are previously defined, and information indicating a definition content is stored in the storage unit 15. Then, based on a name of each of the step and the column, a display location of each product 102 is indicated. For example, a display location of "Ultimate Stir-Fried Noodles" illustrated in FIG. 4 can be represented as "step 3, column B". Note that, a representation method for a display location is not limited to the above-described method, and another method is employable.

A means for determining, based on an image analysis, a display location of each of products is not specifically limited, and any technique is employable. The display location determination unit 12 may determine, for example, based on pattern matching or the like, all products included in the image P. Further, the display location determination unit 12 may determine, based on previously-registered characteristics of an appearance of the product display shelf 101, a shelf board, a bottom board, a top board, a side wall, and the like of the product display shelf 101. Note that, a shelf board, a bottom board, a top board, a side wall, and the like may be attached with a predetermined mark. Then, the display location determination unit 12 may determine, based on the mark, a shelf board, a bottom board, a top board, a side wall, and the like of the product display shelf 101.

Then, the display location determination unit 12 can determine, based on the determined shelf board, bottom board, and top board, on what step each of determined products 102 is displayed. Further, the display location determination unit 12 counts products 102, for example, in order from a side wall of a left end, and thereby can determine in what column each of the determined products 102 is displayed.

Note that, a means for determining, based on an image analysis, a display location of each of products described herein is merely one example, and therefore is not limited to this example.

By the way, the number of columns of a product display shelf 101 may be different, depending on a size of a product to be displayed and the like. Specifically, when small products are displayed, the number of columns is increased, and when large products are displayed, the number of columns is decreased. Further, the number of columns and the number of steps of a product display shelf 101 may be different, depending on a configuration of the product display shelf 101. When, for example, product display shelves 101 configured differently for each selling space are used, such a situation may occur.

Therefore, a step and a column are defined with respect to each product display shelf 101 or each product display shelf 101 group, and thereby information indicating a definition content may be stored in the processing apparatus 10. Then, the acquisition unit 11 may further acquire, in addition to an image, information indicating what product display shelf 101 a product display shelf 101 included in each image is, or information indicating to what product display shelf 101 group a product display shelf 101 included in each image belongs.

When a camera fixed in a store captures an image of each product display shelf 101, an association relation between the camera and the product display shelf 101 is previously registered, and thereby it is possible to determine what product display shelf 101 is included in an image acquired from each camera. In other words, in this case, the acquisition unit 11 acquires information discriminating a camera having generated each image as information indicating that each image is an image in which what product display shelf 101 is included.

Further, when a worker captures, while moving, images of a plurality of product display shelves 101, the worker may input, to the processing apparatus 10, information indicating what product display shelf 101 a product display shelf 101 included in each image is, or information indicating to what product display shelf 101 group a product display shelf 101 included in each image belongs. Information indicating what to be a product display shelf 101 is, for example, discrimination information (a serial number or the like) assigned to each of a plurality of product display shelves 101. Further, information indicating to what product display shelf 101 group belongingness is relevant is, for example, "a product display shelf 101 in a fifth passage", "a product display shelf 101 in a bread selling space", or the like.

Further, when a robot captures, while moving, images of a plurality of product display shelves 101, the robot or the processing apparatus 10 may determine, based on a location of the robot and a direction of a camera at a time of capturing each image and a map indicating a location of each product display shelf 101 in a store, what product shelf 101 a product display shelf 101 included in each image is, or to what product display shelf 101 group a product display shelf 101 included in each image belongs.

Referring back to FIG. 2, the computation unit 13 computes, based on a display location of each of determined products 102, a sales-related score (an evaluation value of a product layout) relating to sales. The computation unit 13 can compute a sales-related score, based on score information indicating, with respect to each product 102, a score when display is carried out in each of a plurality of display locations.

FIGS. 5 and 6 each illustrate one example of score information. FIG. 5 is score information of a product A, and FIG. 6 is score information of a product B. In this manner, score information is generated with respect to each product 102, and the generated score information is stored in the storage unit 15. The illustrated score information indicates that a display location having a higher value achieves higher sales of a product 102. Score information is generated, for example, based on a past display result, a sales result, and the like.

The computation unit 13 extracts, with respect to each product 102, based on a display location of each product 102 determined by the display location determination unit 12 and score information as described above, a score relevant to a display location of each product 102. Then, the computation unit 13 computes a sales-related score, based on the extracted score with respect to each product 102. The computation unit 13 may compute, as a sales-related score, for example, a statistical value (e.g., an average value, a mode, a median, or the like) of the extracted score with respect to each product 102, or may compute, as a sales-related score, a total value of the extracted score with respect to each product 102

The computation unit 13 may compute, for example, with respect to each shelf of product display shelves 101, a sales-related score. In other words, the computation unit 13 may compute, based on a score of a product 102 displayed on each product display shelf 101, a sales-related score of each product display shelf 101.

In addition, the computation unit 13 may compute a sales-related score with respect to each group of a plurality of product display shelves 101 (e.g., a group of product display shelves 101 in the same selling space, a group of product display shelves 101 installed along the same passage, or the like). In other words, the computation unit 13 may compute a sales-related score of each group, based on a score of a product 102 displayed on product display shelves 101 belonging to each group.

In addition, the computation unit 13 may compute a sales-related score in one store as a whole. In other words, the computation unit 13 may compute, based on a score of a product 102 displayed on a product display shelf 101 installed in one store, a sales-related score in one store as a whole.

In addition, the computation unit 13 may compute a sales-related score with respect to each part of one product display shelf 101. In other words, the computation unit 13 may compute, based on a score of a product 102 displayed on a part of a product display shelf 101, a sales-related score of a part of the product display shelf 101.

Referring back to FIG. 2, the output unit 14 outputs a sales-related score computed by the computation unit 13.

In addition, the output unit 14 may output information indicating a product display shelf 101, the group, a store, or a part of a product display shelf 101 in which a sales-related score satisfies a predetermined condition. The output unit 14 may output, for example, a list of product display shelves 101 in which a sales-related score satisfies a predetermined condition, a list of the group in which a sales-related score satisfies a predetermined condition, a list of stores in which a sales-related score satisfies a predetermined condition, or a list of a part of product display shelves 101 in which a sales-related score satisfies a predetermined condition. As the predetermined condition, a matter that "a sales-related score is equal to or less than a reference value", a matter that "a sales-related score is equal to or more than a reference value", or the like is exemplified.

Further, the output unit 14 may further output an image of a product display shelf 101, the group, a store, or a part of a product display shelf 101 in which a sales-related score is equal to or less than a reference value. Then, in the image, a product 102 in which a score is equal to or less than a reference value may be emphatically displayed by using a frame or the like. Further, the output unit 14 may output in such a way that an image of a product display shelf 101, the group, a store, or a part of a product display shelf 101 in which a sales-related score is equal to or less than a reference value and an image of a product display shelf 101, the group, a store, or a part of a product display shelf 101 in which a sales-related score is larger than a reference value can compare with each other.

Figure 7:
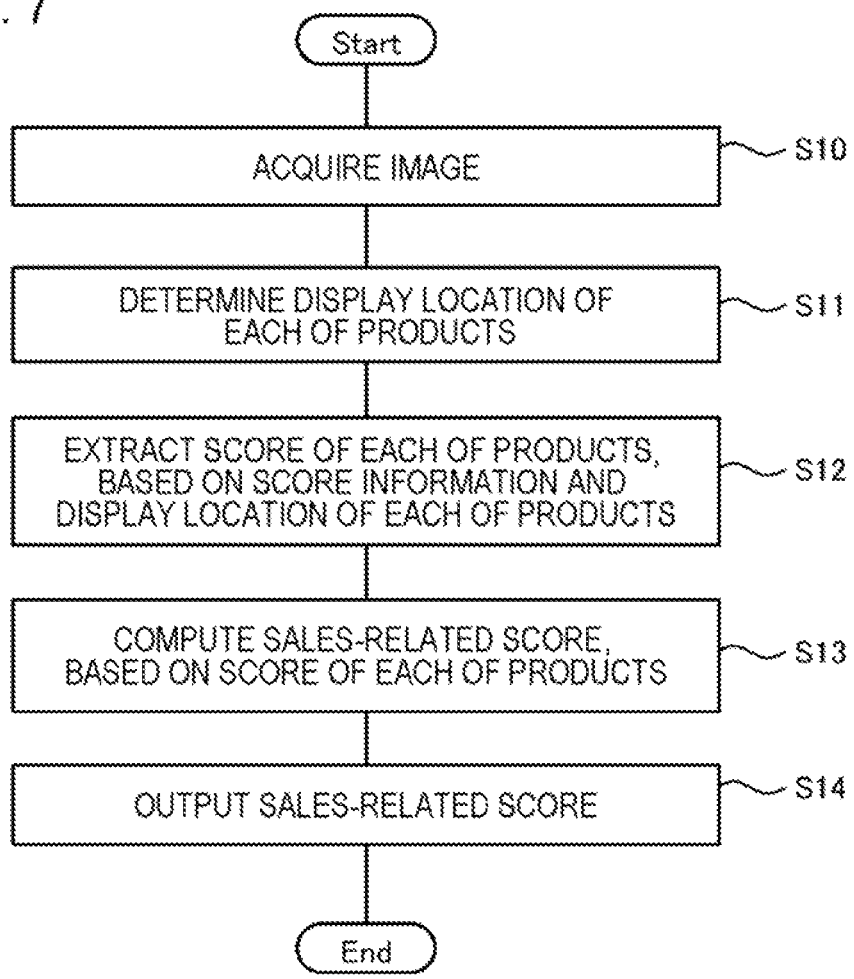
FIG. 7 is a flowchart illustrating one example of a flow of processing of the processing apparatus according to the present example embodiment.

Next, by using a flowchart in FIG. 7, one example of a flow of processing of the processing apparatus 10 is described.

When the acquisition unit 11 acquires an image including a product display shelf 101 (S10), the display location determination unit 12 determines, based on the image, a display location of each of products 102 (S11).

Next, the computation unit 13 extracts, based on score information (refer to FIGS. 5 and 6) of each of the products 102 and a display location of each product 102 determined in S11, a score relevant to the display location of each product 102 with respect to each product 102 (S12). Then, the computation unit 13 computes, based on the extracted score of each product 102, a sales-related score (S13). Next, the output unit 14 outputs the computed sales-related score (S14).

Note that, the processing apparatus 10 may be installed in each of a plurality of stores, and compute a sales-related score relating to each store. In addition, the processing apparatus 10 may be a center apparatus that communicates with a store apparatus installed in each of a plurality of stores, receives various types of information (an image and the like) from the store apparatus, and computes a sales-related score relating to each of the plurality of stores.

According to the processing apparatus 10 of the present example embodiment described above, it is possible to evaluate whether, based on a display location of each product 102, a state where a display state of a product 102 can achieve a sales increase is achieved. Further, when an image is analyzed, a display location of each product 102 can be determined, and therefore a load on a worker can be reduced, compared with a case where a worker determines a display location of each product 102 and inputs the determined display location to an apparatus.

Further, the processing apparatus 10 can compute a sales-related score with respect to each product display shelf 101. Therefore, it is possible to evaluate, with respect to each product display shelf 101, whether a state where a display state of a product 102 can achieve a sales increase is achieved.

Further, the processing apparatus 10 can compute a sales-related score with respect to each group of a plurality of product display shelves 101. Therefore, for example, with respect to each selling space, it is possible to evaluate whether a state where a display state of a product 102 can achieve a sales increase is achieved.

Further, the processing apparatus 10 can compute a sales-related score in a store as a whole. Therefore, with respect to each store, it is possible to evaluate whether a state where a display state of a product 102 can achieve a sales increase is achieved.

Further, the processing apparatus 10 can compute a sales-related score with respect to each part of a product display shelf 101. Therefore, with respect to each part of a product display shelf 101, it is possible to evaluate whether a state where a display state of a product 102 can achieve a sales increase is achieved.

Further, the processing apparatus 10 can determine a product display shelf 101, a group, a store, or a part of a product display shelf 101 in which a sales-related score satisfies a predetermined condition. Based on the determined content, a worker can easily determine a place where it is necessary to modify a display layout.

Second Example Embodiment

First, an outline of a processing apparatus 10 according to the present example embodiment is described. A method of displaying a product 102 in which a sales increase can be achieved may be different, depending on an attribute of a store (whether to be a store in front of a station, whether to be a store in an business district, whether to be a store in a student quarter, and the like), a season, an attribute of each product 102 (whether to be a product handled in the store for a first time, whether to be a product in which a predetermined period has elapsed from start of handling, whether a product as a campaign target, and the like), and the like. Therefore, the processing apparatus 10 according to the present example embodiment stores, with respect to each product 102, a plurality of pieces of score information, and computes, based on score information satisfying a condition, the above-described sales-related score. By doing so, it is possible to appropriately evaluate whether a state where a display state of a product 102 can achieve a sales increase is achieved, by considering an attribute of a store, a season, an attribute of each product 102, and the like.

Next, a configuration of the processing apparatus 10 according to the present example embodiment is described. One example of a function block diagram of the processing apparatus 10 according to the present example embodiment is illustrated in FIG. 2, similarly to the first example embodiment.

According to the present example embodiment, a plurality of pieces of score information are generated with respect to each product 102, and stored in a storage unit 15. Then, a condition for applying each of the plurality of pieces of score information is determined and stored in the storage unit 15.

FIGS. 8 and 9 each illustrate a part of a plurality of pieces of score information generated relevantly to a product A. FIG. 8 is score information of a product A generated for a store in a student quarter. FIG. 9 is score information of a product A generated for a store in a business district. Another example of an application condition includes, but not limited to, a condition for a store in front of a station, for a local city, for an urban area, for a residential area, for spring, for summer, for autumn, for winter, for a new product in which a predetermined period has not elapsed from start of handling in a store, for a regular product in which a predetermined period has elapsed from start of handling in a store, for a campaign-target product, a condition acquired by combining these described above by a logical operator, or the like.

A computation unit 13 acquires material information, and determines, based on the acquired material information, score information satisfying a condition. Then, the computation unit 13 computes a sales-related score, based on the determined score information. The material information is information being a material for determining whether an application condition as described above is satisfied. The material information includes, for example, at least one of attribute information of a store provided with a product display shelf 10 included in an image, information indicating a timing (time and date) of generating an image, and information relating to a product 102.

As attribute information of a store, an address, a type of a location (e.g., a student quarter, a business district, a front of a station, a local city, an urban area, a residential area, or the like), and the like are exemplified. As information relating to a product 102, information (time and date) indicating a start timing of handling in a store, information indicating whether to be a campaign-target product, and the like are exemplified.

A part or a whole of these pieces of material information may be previously stored in the storage unit 15. Then, the computation unit 13 may acquire, from the storage unit 15, attribute information of a store where an image acquired by an acquisition unit 11 is captured and related information of a product 102 included in the image.

Other configurations of the processing apparatus 10 are similar to the first example embodiment.

According to the processing apparatus 10 of the present example embodiment described above, an advantageous effect similar to the first example embodiment is achieved.

Further, according to the processing apparatus 10 of the present example embodiment that stores a plurality of pieces of score information with respect to each product 102 and computes, based on score information satisfying a condition, the above-described sales-related score, it is possible to appropriately evaluate whether a state where a display state of a product 102 can achieve a sales increase is achieved, by considering an attribute of a store, a season, an attribute of each product 102, and the like.

While the invention of the present application has been particularly described with reference to the example embodiments (and examples), the invention of the present application is not limited to the example embodiments (and examples) described above. It will be understood by those of ordinary skill in the art that various changes in form and details of the invention of the present application may be made within the scope of the invention of the present application.

REFERENCE SIGNS LIST

1A Processor
2A Memory
3A Input/output I/F
4A Peripheral circuit
5A Bus
10 Processing apparatus
11 Acquisition unit
12 Display location determination unit
13 Computation unit
14 Output unit
15 Storage unit

What is claimed is:

1. A system comprising:
 a processing apparatus comprising:
  at least one memory configured to store one or more instructions; and
  at least one processor configured to execute the one or more instructions to:
   acquire an image including a product display shelf;
   determine, based on the image, a display location of each of products in the product display shelf;
   compute, based on the determined display location of each of the products in the product display shelf, a sales-related score indicating an evaluation value of a product layout of the product display shelf; and
   output the computed sales-related score; and
 a robot including a camera and in communication with the processing apparatus and configured to move to and image the shelf to acquire the image including the product display shelf and determine, based on a location of the robot and a direction of the camera at a time of capturing each image and a map, the display location of each product display shelf in the store.

2. The system according to claim 1, wherein
the processor is further configured to execute the one or more instructions to compute the sales-related score, based on score information indicating, with respect to the each product, a score when the each product is displayed on each of a plurality of display locations.

3. The system according to claim 2, wherein
a plurality of pieces of the score information are generated with respect to the each product, and a condition for applying each of the plurality of pieces of the score information, and
the processor is further configured to execute the one or more instructions to acquire information including at least one of attribute information of a store provided with the product display shelf included in the image, information indicating a timing of generating the image, and information relating to the product, determine, based on the acquired information, the score information satisfying the condition, and compute, based on the determined score information, the sales-related score.

4. The system according to claim 1, wherein the processor is further configured to execute the one or more instructions to compute the sales-related score in a store as a whole.

5. The system according to claim 1, wherein the processor is further configured to execute the one or more instructions to compute the sales-related score with respect to each product display shelf.

6. The system according to claim 1, wherein the processor is further configured to execute the one or more instructions to compute the sales-related score with respect to each group of a plurality of the product display shelves.

7. The system according to claim 1, wherein the processor is further configured to execute the one or more instructions to compute the sales-related score with respect to each part of the product display shelf.

8. A method comprising:

by a computer of a processing apparatus,
   acquiring an image including a product display shelf;
   determining, based on the image, a display location of each of products in the product display shelf;
   computing, based on the determined display location of each of the products in the product display shelf, a sales-related score indicating an evaluation value of a product layout of the product display shelf; and
   outputting the computed sales-related score; and by a robot including a camera and in communication with the processing apparatus, moving to and imaging the shelf to acquire the image including the product display shelf and determining, based on a location of the robot and a direction of the camera at a time of capturing each image and a map, the display location of each product display shelf in the store.

\* \* \* \* \*